Patented May 17, 1932

1,858,300

UNITED STATES PATENT OFFICE

CLEMENS A. LAISE, OF TENAFLY, NEW JERSEY, ASSIGNOR TO CALLITE PRODUCTS COMPANY, INCORPORATED, OF UNION CITY, NEW JERSEY, A CORPORATION OF NEW JERSEY

REFRACTORY COMPOSITION

No Drawing.   Application filed May 13, 1930. Serial No. 452,126.

My invention relates to refractory compositions of great hardness and strength suitable for use in the arts in the place of pure diamond, and also suitable in place of the present high speed steels and abrasives used for grinding wheels and cutting tools, dies for drawing wire, jewels of watch movements, electrical measuring instruments where hardened points are necessary, and for many other purposes.

In practicing my invention I have produced a number of compositions which approach very nearly the hardness of diamonds and sapphires.

The products of my invention are also very useful in connection with hones and wear resisting bodies in general, also for drilling and hammering tools and working surfaces where great hardness is required, and in general for uses where sharp edges which will resist wear are required, and for contact surfaces where hardness and resistance to high temperatures are a requisite.

The present invention provides, broadly speaking, a process wherein I employ refractory metallic carbides mixed with refractory oxides, the constituent particles being bonded to produce bodies of great hardness and toughness and much more efficient for cutting and grinding purposes than where either of these constituents is used alone.

More specifically my invention consists in mixing a finely divided or powdered refractory metallic carbide such as tungsten carbide, uranium carbide, molybdenum carbide, beryllium carbide, etc. with refractory oxide, such as aluminum oxide, thorium oxide, titanium oxide, etc., and effecting a bond between the particles of the mixture. If the powders are very dense and fine I prefer to add a refractory nitride to the mixture so that the resultant product becomes somewhat porous on baking. In fact I find that the presence of a refractory nitride tends to materially harden and toughen the product.

The mixture is then compressed and shaped into the forms desired and may then be baked and finally subjected to the action of a molten base metal by surrounding the shaped forms with molten metal or by immersion in a bath of the metal, until the pores of the compressed forms are completely filled with the base metal and a homogeneous hard body is produced.

In some cases instead of bonding the carbide and oxide constituents with molten metal I may introduce the base metal powders into the mixture of refractory carbides and oxides or mixtures of refractory carbides, oxides and nitrides, and ball mill the mixture until a homogeneous powder is produced, after which the mixture is compressed into the shapes desired, baked and finely sintered so that the individual grains are bonded by means of sintered base metal instead of molten base metal.

Generally speaking, however, I find that when the particles of the mixture are bonded with a molten base metal such as molten cobalt, molten nickel, for example, better results are obtained in that a more compact, stronger, harder and tougher product results, which of course under some condition of use is of material advantage.

The above description is a more or less general outline of my improved process.

Still more specifically the process of the present invention consists in mixing tungsten carbide, 60% to 90%, aluminum oxide 2½% to 30%, boron nitride .1% to 1% and a base metal such as cobalt, 5% to 30%. The tungsten carbide is produced in as fine a metallic powder as possible and the aluminum oxide powder, preferably of coarser texture, is then added. The boron nitride powder, as fine as possible, is then added.

This mixture is then milled in a ball mill for ten to twenty hours. For clarity of description I shall refer to this mixture as mixture A.

Simultaneously a cobalt powder reduced from oxide or oxalate with hydrogen is produced and will be termed B.

Either of two procedures may then be followed, depending a great deal upon the purpose for which the final product is used.

Procedure 1 consists in compressing mixture A either with or without an organic binder into the shapes desired. These bodies are then baked at about 1000° C. and subjected to the action of molten base metal such as that comprising mixture B, as by surrounding the bodies with this molten metal or by immersion in a molten bath. The base metal, as above stated, may be for example nickel, cobalt, iron, etc.

An effective means of immersing the compressed bodies is to suspend them from supports of tungsten or other refractory wire so that when the period of absorption and hardening has expired they may be quickly lifted out of the bath by means of the support and quickly cooled. The outer adhering film of the base metal on the bodies is then either machined off or removed by chemical means well known in the art.

The immersion of the compressed bodies in the bath of molten base metal may take place either in air, hydrogen, vacuum, or other reducing atmospheres, and the body is permitted to remain in the bath long enough for the molten constituents to seep through the porous refractory bodies to fill up the pores thereof and cement or bond the refractory grains.

In following procedure 2, mixture B, i. e., a base metal powder such as cobalt, nickel, iron, etc. is mixed with mixture A in the proportion of 5 to 25%, this mixture then being ball milled for from five to six hours to produce what I shall term mixture C.

Mixture C is then compressed into the shapes desired at a pressure of about twenty to fifty tons per square inch and these compressed bodies are then baked at about 900° C. in an atmosphere of hydrogen, vacuum, or other inert atmosphere. At the completion of this baking operation I find that the compressed bodies have been converted into a fairly hard product which, however, can still be worked. In view of this fact, therefore, the compressed bodies which by the first shaping operation only approximate the final desired form are further shaped into final form and are then subjected to heat treatment at high temperatures of the order of 1500 to 1800° C. to produce a completely sintered hardened body.

In this connection I might add that the sintering process is preferably finally carried out in vacuum, since if the final sintering takes place in vacuum a much more compact body results. This is of material advantage when the finished product is employed for wire drawing dies where it is necessary that the die material be as free of pores as possible.

By both procedures, however, I find that the resulting product is very hard, will easily scratch glass, and approaches the hardness of diamond. I find also that my finished product is very tough whether made by procedure 1 or procedure 2 and may be subjected to considerable strain and stress in hammering action without disintegrating.

In this specific example above given I mention tungsten carbide, aluminum oxide and boron nitride and cobalt, nickel, or iron, as the base metal. It is to be distinctly understood that other carbides, such as uranium carbide, molybdenum carbide, etc. and other oxides such as thorium oxide, titanium oxide, etc. can be substituted for those mentioned in this specific example above referred to. It is to be understood also that boron nitride is mentioned merely by way of example and that other nitrides can be used with good results.

What I claim is:—

1. An alloyed composition of matter comprising tungsten carbide and aluminum oxide, in the proportions 60% to 90% tungsten carbide, 2% to 25% aluminum oxide, bonded with a metal of the iron group.

2. An alloyed composition of matter comprising tungsten carbide and aluminum oxide, in the proportions 60% to 90% tungsten carbide, 2% to 25% aluminum oxide, and bonded with cobalt, 5% to 30%.

3. An alloyed composition of matter comprising tungsten carbide, aluminum oxide, and boron nitride, in the proportions 60% to 90% tungsten carbide, 2% to 25% aluminum oxide, .1% to 1% boron nitride, and bonded with a metal of the iron group.

4. An alloyed composition of matter comprising a compressed mixture of tungsten carbide, aluminum oxide, boron nitride, in the proportions 60% to 90% tungsten carbide, 2% to 25% aluminum oxide, .1% to 1% boron nitride, and bonded with a metal of the iron group, 5% to 30%.

5. An alloyed composition of matter comprising tungsten carbide 60% to 90%, aluminum oxide 2% to 25% and boron .1% to 1%, bonded with a metal of the iron group 5% to 30%.

6. An alloyed composition of matter comprising tungsten carbide 60% to 90%, aluminum oxide 2% to 25%, boron and boron nitride .1% to 1%, bonded with a metal of the iron group 5% to 30%.

This specification signed this 10th day of May, 1930.

CLEMENS A. LAISE.